(12) United States Patent
Mecklenburg et al.

(10) Patent No.: US 9,203,927 B1
(45) Date of Patent: Dec. 1, 2015

(54) CONTENT DELIVERY SCHEDULER

(71) Applicants: Paul Richard Mecklenburg, Pittsburgh, PA (US); Timothy Andrew James, San Francisco, CA (US); Kai Chen, Brisbane, CA (US)

(72) Inventors: Paul Richard Mecklenburg, Pittsburgh, PA (US); Timothy Andrew James, San Francisco, CA (US); Kai Chen, Brisbane, CA (US)

(73) Assignee: Google Inc., Mountain View, CA (US)

( * ) Notice: Subject to any disclaimer, the term of this patent is extended or adjusted under 35 U.S.C. 154(b) by 472 days.

(21) Appl. No.: 13/717,356

(22) Filed: Dec. 17, 2012

(51) Int. Cl.
*G06F 15/16* (2006.01)
*H04L 29/08* (2006.01)
*G06Q 30/02* (2012.01)

(52) U.S. Cl.
CPC ............. *H04L 67/32* (2013.01); *G06Q 30/02* (2013.01)

(58) Field of Classification Search
CPC .............................. H04W 4/021; H04L 67/32
USPC .................................................. 709/217–219
See application file for complete search history.

(56) References Cited

U.S. PATENT DOCUMENTS

| | | | | |
|---|---|---|---|---|
| 8,543,446 B2* | 9/2013 | Richardson | .......... | G06Q 30/201 705/7.31 |
| 2011/0251875 A1* | 10/2011 | Cosman | ............... | G06Q 10/087 705/7.31 |
| 2012/0079519 A1* | 3/2012 | Fu | ...................... | G06Q 30/0201 725/14 |
| 2012/0124073 A1* | 5/2012 | Gross | ............... | G06F 17/30873 707/767 |
| 2013/0305273 A1* | 11/2013 | Hadfield | ............ | H04N 1/44204 725/14 |

* cited by examiner

*Primary Examiner* — Mohamed Wasel
(74) *Attorney, Agent, or Firm* — Foley & Lardner LLP; John D. Lanza

(57) ABSTRACT

A content scheduler for scheduling content publication is provided. The content scheduler may include instructions to generate a time window and a quota. For example, the instructions may cause a processor to generate a first time window for placing a first article of content. The instructions may also include a first quota indicating a first total number of impressions. The content scheduler may also include an analyzer configured to be run by the processor. The analyzer may be configured to determine when first and second articles of content should be scheduled to be published. The analyzer may be configured to determine a first average number of impressions per unit of time needed to deliver the total number of impressions required by the first quota. The analyzer may be configured to determine whether there is a period of overlapping time between the first and second articles of content.

21 Claims, 9 Drawing Sheets

CONTENT DELIVERY SCHEDULER

BACKGROUND

Content providers request content publishers to deliver content to users. Content publishers deliver the requested content by serving the requested content from content servers to users. Content providers may include one or more constraints on the manner in which content publishers are to serve the requested content. Content publishers attempt to deliver the requested content while satisfying the one or more constraints.

SUMMARY

A content scheduler configured to generate schedule data is disclosed. The content scheduler may be stored on tangible computer readable storage media or built into a specially designed computer as specially designed circuitry. A computer executing the content scheduler may use one or more processors to execute instructions for the content scheduler.

The content scheduler may comprise instructions to generate a time window and a quota. For example, the instructions may cause the processor to generate a first time window for placing a first article of content. The first time window may comprise a first start time and a first end time. The instructions may also comprise a first quota indicating a first total number of impressions. The instruction may also comprise a second time window for placing the second article of content. The second time window may comprise a second start time and a second end time. The instructions may comprise a second quota indicating a second total number of impressions.

The content scheduler may also comprise an analyzer configured to be run by the processor. The analyzer may be configured to determine when the first and second articles of content should be published. The analyzer may be configured to determine a first average number of impressions per unit of time needed to deliver the total number of impressions required by the first quota. The analyzer may be configured to determine a second average number of impressions per unit of time needed to deliver the total number of impressions required by the second quota. The analyzer may be configured to determine whether there is a period of overlapping time between the first and second article of content. The analyzer may be configured to determine whether the scheduler can meet the first quota for the first article of content despite the period of overlapping time. If the determination is positive, the analyzer may instruct a content server to deliver the impressions at the first average number of impressions per unit of time. If the determination is negative, the analyzer may instruct the content server to deliver more than the first average number of impressions per unit of time to account for the overlapping time period.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
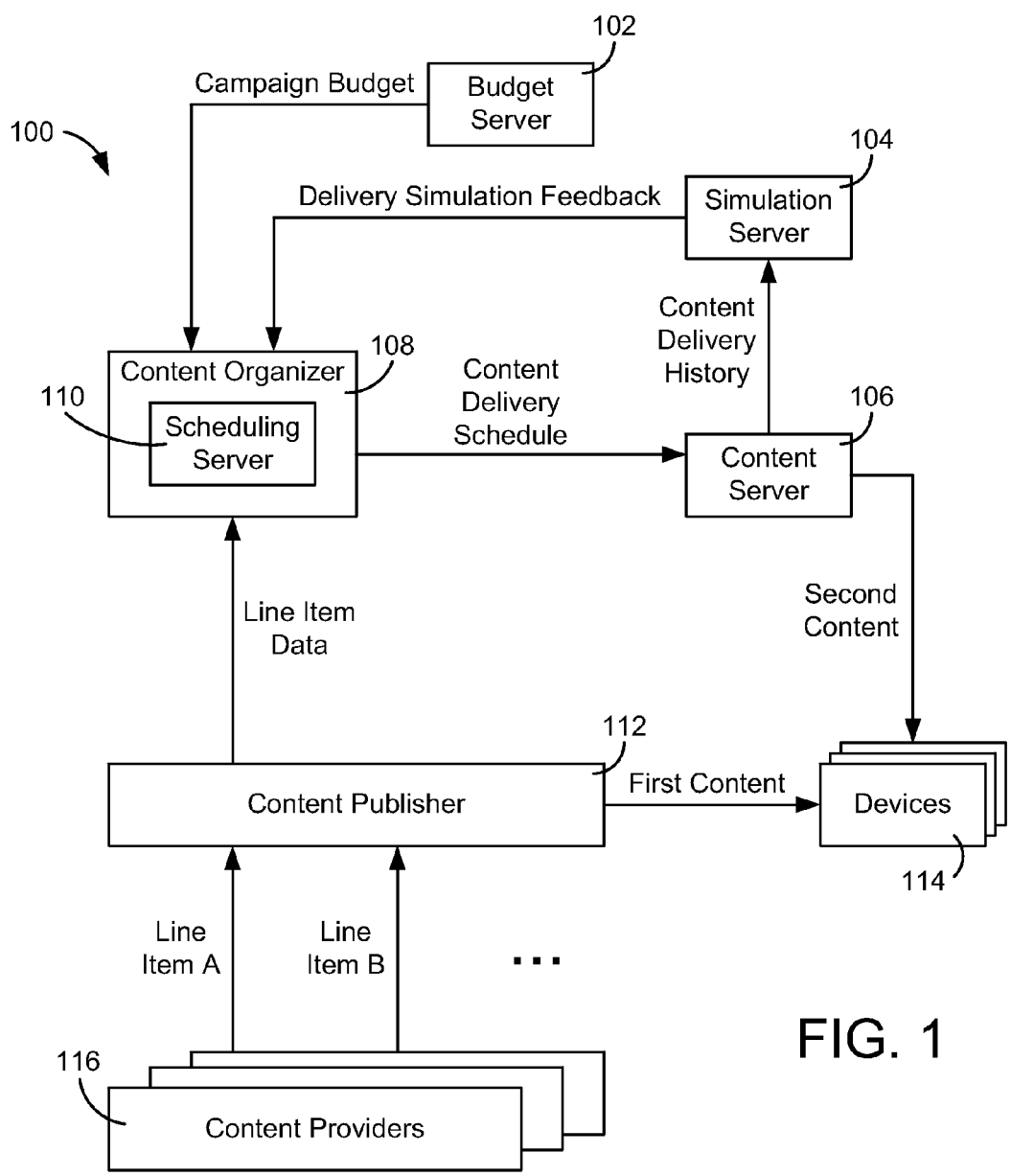
FIG. 1 is a block diagram of a computer system for generating a content delivery schedule, according to an illustrative implementation.

Content publishers may provide first content, such as a website, along with second content, such as advertisements, to users at, e.g., client computing devices. According to an illustrative implementation, content publishers are operators of websites. A content publisher may have display space available (e.g., on the content publisher's website) for second content. When computing devices access the first content (e.g., individuals visiting a website), the devices may also access the second content. A content provider may request that a content publisher provide certain specified second content to one or more client devices. According to an illustrative implementation, the content provider is an advertiser that wants a particular advertisement to be displayed on the publisher's website. The content provider's request may include that the content receive a particular number of impressions (e.g., the number of times the second content is provided by the publisher along with the first content).

The content provider's request may include one or more constraints. The constraints may be one or more conditions that specify the manner in which second content is provided. For example, the constraints may include that the content should be provided to devices within a certain period of time (e.g., between May 1 and May 5, between 9 AM and 5 PM, etc.). The constraints may include that the content should be provided to devices in certain geographical locations (e.g., Canada, Kansas, etc.). The constraints may include that a particular type of content should be provided (e.g., a 300 pixel×250 pixel full motion video banner, a 160 pixel×600 pixel static graphic banner, etc.). Other types of constraints may be associated with delivery of a content item.

Delivery of content items to satisfy a provider's request (i.e., impressions and constraints) is challenging. For example, if a content item is time-restricted (e.g., serve content only between 5 PM and 9 PM), then achieving the requested number of impressions is challenging because a content publisher has a limited time during which to serve the content. If a content item is location-restricted (e.g., serve content only to devices in Canada), then achieving the requested number of impressions is challenging because a content publisher is limited to devices only in the specified locale. If a particular type of content item is requested (e.g., serve a 300 pixel×250 pixel full motion video banner), then achieving the requested number of impressions is challenging because a publisher has limited space on, e.g., the publisher's website, on which the specified content may be provided. For example, a publisher may have only one spot for a 300 pixel× 250 pixel banner, whereas the publisher may have two spots for a 160 pixel×600 pixel banner.

In addition, delivery of one content item may be associated with multiple constraints (e.g., serve content (a) only between 5 PM and 9 PM, and (b) only to devices in Canada). Moreover, a publisher may receive requests for multiple content items that have overlapping constraints. For example, serve content A between 5 PM and 9 PM to devices in Canada, and serve content B between 6 PM and 10 PM to devices in North America. To satisfy both sets of constraints (and meet the impressions targets for each content item), content delivery must be coordinated between overlapping time constraints and overlapping geographical constraints. In various implementations, more or fewer constraints, which may or may not overlap, are associated with the one or more content items.

The combination of a content item and its associated constraints may be referred to in the discussion herein as a "line item." A provider's "campaign" may include one or more line items. For example, a campaign may include multiple related content items. For example, a producer of kitchen goods has different content items (e.g., small static graphic, medium full motion video, large animation, etc.) describing the launch of a new product. The kitchen goods producer may request a publisher of a recipe website to display the different content items on the publisher's website. The producer may specify that each content item should receive a certain number of impressions. The producer may also specify one or more constraints associated with how the content items are delivered. A content provider may have multiple campaigns. Line items and/or campaigns may be associated with a budget. The budget may include a target amount of money that a content provider is agreeing to spend for a publisher to display the provider's content.

A content publisher may receive requests from one content provider for multiple line items (i.e., multiple second content items, each with a set of constraints). A publisher may also receive requests from multiple providers, each of whom have multiple line items. Conflicting constraints may arise among the numerous line item requests that a publisher receives. The content publisher's goal is to satisfy the impressions requests and the constraints of the requested content items as best as possible.

Content publishers may work with a content organizer to provide and/or publish second content. A content organizer may be an entity that stores second content, coordinates delivery of second content, maintains statistics of second content delivery, generates metrics associated with second content delivery, etc. A content organizer may generate a content serving schedule, which may be implemented by a content server. A content organizer may coordinate content delivery for multiple publishers.

In one or more implementations of the present disclosure, a content scheduler is provided. According to an illustrative implementation, a content scheduler may include one or more computing systems (e.g., server computers). The content scheduler may be configured to determine when content items should be published so that the items are published based on an optimized schedule. The optimized schedule may advantageously result, or nearly result, in the impressions requested for the content items. The optimized schedule may advantageously satisfy, or nearly satisfy, the constraints associated with the content items. In one or more implementations, the content scheduler may advantageously generate and deliver the optimized schedule to a content server. According to an another illustrative implementation, the content scheduler is utilized by a content organizer to coordinate content delivery. In other implementations, the content scheduler may be implemented on one or more computing systems associated with the content publisher.

In one or more implementations, the content scheduler may be configured to include a planning phase. The planning phase may also include generating an optimized content serving plan or schedule for one or more campaigns based on the predicted traffic and the traffic allocations between competing campaigns. The planning phase may advantageously account for both predicted traffic and competing line items. Competing line items may be two or more content items that are requested to be delivered with overlapping constraints (e.g., time, geography, etc.). The planning phase may include generating predictions of the expected traffic (e.g., the number, frequency, etc., of devices accessing the second content). The content scheduler may generate or receive traffic predictions. Traffic prediction may include the expected number of impressions for a future period of time. Based on the traffic predictions, the content scheduler may be configured to create a serving plan using the line item goal (e.g., the number of impressions for the content item) adjusted proportionally to the predicted traffic for each time period. (Periods may be days, hours, minutes, etc.) By configuring the scheduler to look at per line item matching traffic patterns, problems associated with changes in traffic may be advantageously minimized. The planning phase may also include allocating the traffic between competing campaigns. According to an illustrative implementation, the content scheduler may be configured to perform offline allocations of the traffic to the line items. The allocations may be used as an input to the content server. The optimized content delivery plan may account for current campaigns and future campaigns.

For example, a content scheduler may coordinate the delivery of two content items with delivery requested during an overlapping period of time. The content scheduler may be configured so it generates schedule data to instruct a content placement server to over-deliver an article of content in the beginning of a time window of publication, if the content scheduler has determined that competition caused by a second article of content may cause the content placement server to under-deliver impressions of the first article of content. In some implementations, delivery of multiple content items with an overlapping geographical delivery constraint may be coordinated. In some implementations, delivery of multiple content items with time overlaps, geography overlaps, and/or other overlapping constraints may be coordinated.

Referring to FIG. 1, a block diagram of a computer system 100 for generating a content delivery schedule is shown, according to an illustrative implementation. The blocks of FIG. 1 may represent one or more computing systems. The computing systems may communicate via a network. The network may be any form of computer network that relays information between devices 114, content providers 116, content publisher 112, content organizer 108, budget server 102, simulation server 104, and content server 106. For example, the network may include the Internet and/or other types of data networks, such as a local area network (LAN), a wide area network (WAN), a cellular network, a satellite network, or other types of data networks. The network may include any number of computing devices (e.g., computers, servers, routers, network switches, etc.) that are configured to receive and/or transmit data within the network. The network may include any number of hardwired and/or wireless connections. For example, devices 114 may communicate wirelessly (e.g., via WiFi, cellular, radio, etc.) with a transceiver that is hardwired (e.g., via a fiber optic cable, a CAT5 cable, etc.) to other computing devices in the network.

System 100 includes devices 114. According to an illustrative implementation, devices 114 may represent one or more client computing devices. A client computing device may be any number of different user electronic devices configured to communicate via a network (e.g., a laptop computer, a desktop computer, a tablet computer, a smartphone, a digital video recorder, a set-top box for a television, a video game console, etc.). Devices 114 may include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of devices 114 (e.g., a built-in display, microphone, etc.) or external to the housing of devices 114 (e.g., a monitor connected to device 114, a speaker connected to device 114, etc.), according to various implementations. For example, device 114 may include an electronic display, which visually displays web pages and/or advertisements using data received from content publisher 112 and/or content server 106.

System 100 includes one or more content providers 116. Content provider 116 may represent one or more computing systems associated with entities with content they wish to have displayed on a content publisher's publication. The number of content providers may vary. For example, during a holiday shopping season, the number of content providers related to consumer products may increase. Content providers 116 are shown to request that line item A and line item B be delivered by content publisher 112. As with the number of content providers 116, the number of line items requested may vary. The line items requested by content providers 116 may include impressions requirements and constraints. The constraints may or may not overlap. In some implementations, content providers 116 may input a content item, impressions requirement, constraints, etc., via graphical user interface (GUI) elements. In some implementations, the GUI may be served by a content publisher 112 to a client computing device associated with content provider 116. In other implementations, the GUI may be served by content organizer 108.

System 100 includes content publisher 112 and content organizer 108. Content publisher 112 and content organizer 108 may include one or more electronic devices connected to a network. For example, content publisher 112 and content organizer 108 may include computer servers (e.g., FTP servers, file sharing servers, web servers, etc.) or other devices that include a processing circuit. Budget server 102, simulation server 104, and content server 106 may be computer servers associated with content publisher 112 and/or content organizer 108.

Budget server 102 may be one or more computing devices configured to receive, store, and/or retrieve budget data associated with one or more campaigns. Budget server 102 may maintain up-to-date or nearly up-to-date records associated with content delivery expenditures. For example, budget server 102 may store a target amount of money a content provider wants to spend on the delivery of a content item and/or campaign. The target amount may be a per-impression amount or a total amount. Budget server 102 may receive statistics relating to the delivery of a content item and/or campaign, and adjust (e.g., reduce) a remaining budget for the content item and/or campaign. Content organizer 108 may advantageously schedule content delivery such that budgets associated with one or more campaigns are met. That is, content is neither under-delivered (resulting in the provider's actual expenditure being less than the target expenditure) nor over-delivered (resulting in the provider's actual expenditure being greater than the target expenditure). In various implementations, budgets may be organized by campaign, by content item, by line item, etc. Budget server 102 may be configured to associate a line item received from a content provider with a budget for at least one of the content provider's campaigns.

Simulation server 104 may be one or more computing devices configured to forecast content delivery. Simulation server 104 may simulate future content delivery based on content delivery history received from content server 106. The content delivery history may include the number, frequency, time, and type of content delivered, as well as the number and frequency of devices accessing the content. The simulation may incorporate traffic predictions. The simulation may account for multiple competing content items, overlapping constraints associated with the line items, etc. Based on simulations, simulation server 104 may provide feedback to content organizer 108 regarding the predicted success of one or more content delivery plans generated by content organizer 108. The feedback may include whether the impressions and/or constraints associated with one or more campaigns were satisfied when the content items were served based on the content delivery plan. Content organizer 108 may modify the delivery plan based on one or more simulations. According to an illustrative implementation, simulations are generated every day. In other implementations, different time intervals may be used. The simulations may generate a per-hour summary of content delivery for the simulated day.

Content server 106 may store and/or provide digital advertisements to devices 114 via a network. Content publisher 112 may provide a webpage to device 114, in response to receiving a request for a webpage from device 114. In some implementations, an advertisement from content server 106 may be provided to device 114 indirectly. For example, content publisher 112 may receive advertisement data from content server 106 and use the advertisement as part of the webpage data provided to device 114. In other implementations, an advertisement from content server 106 may be provided to device 114 directly. For example, content publisher 112 may provide webpage data to device 114 that includes a command to retrieve an advertisement from content server 106. On receipt of the webpage data, device 114 may retrieve an advertisement from content server 106 based on the command and display the advertisement when the webpage is rendered on a display associated with device 114. Data provided by content server 106 may be referred to as "second content" in the discussion herein. Second content may include text, static graphics, animated graphics, full motion video, rich media, etc. Content server 106 may include several computing devices (e.g., a data center, a network of servers, etc.). In some implementations, content server 106 may be associated with content organizer 108. Content organizer 108 may transmit a content delivery schedule to content sever 106, and content server 106 may deliver content to one or more devices 114 based on the content delivery schedule. Content server 106 may deliver content to one or more websites (e.g., content publisher 112's website and other websites). In some implementations, content server 106 may be unique to a particular content publisher and/or content organizer. In such implementations, content server 106 may serve content only to that content publisher and/or content publishers associated with the content organizer.

Content publisher 112 may provide media content to devices 114. Media content may include, but is not limited to, webpage data, a movie, a sound file, pictures, and other forms of data. This content may collectively be referred to as "first content" in the discussion herein. Content publisher 112 may be configured to receive line item requests from one or more content providers 116. Content publisher 112 may transmit the requested line item data (e.g., content items, impressions, constraints, etc.) to content organizer 108. In some implementations, content publisher 112 may transmit the line items as received from the content providers 116 directly to content organizer 108. In such an implementation, content organizer 108 may organize and/or otherwise process the line item data. In other implementations, content publisher 112 may organize and/or otherwise process the line item data received from the content providers 116. The processed line item data may then be transmitted to content organizer 108. During processing, for example, content publisher 112 and/or content organizer 108 may associate a line item request with a content item, a campaign, a campaign budget, etc. Publisher 112 and/or organizer 108 may also organize the requested content items from one or more providers 116 by requested date, time, type of content, etc. While FIG. 1 is shown to include only one content publisher 112, system 100 may include multiple content publishers 112. For example, multiple publishers 112 may utilize one content organizer 108.

Content organizer 108 may be configured to receive line item data from one or more content publishers 112 and generate a schedule for delivery of content items to devices 114. The line item data may include the content items requested to be delivered, the number of impressions requested, the associated constraints, etc. Content organizer 108 may also receive budget data for a content provider 116's campaigns. A content delivery schedule to satisfy the impressions, constraints, and budget for one or more campaigns may be generated by scheduling server 110 and may be transmitted to content server 106. Content server 106 may use the schedule to deliver content items requested by content providers 116 to devices 114. In generating the schedule, scheduling server 110 may reconcile budgets related to line item requests from content providers 116. For example, content delivery may be increased if a content provider has agreed to expend more than a current amount of content delivery would cost and vice versa. Scheduling server 110 may also formulate traffic predictions (i.e., the number of likely impressions, the rate of the likely impressions, etc.) associated with content item delivery. Scheduling server 110 may generate the optimized schedule by allocating delivery of content items based on the traffic prediction. Scheduling server 110 may also allocate the traffic between content items with overlapping constraints. In some implementations, scheduling server 110 may be part of a computing system of a content organizer 108. In other implementations, such as when no content organizer 108 is part of system 100, scheduling server 110 may be implemented as part of the content publisher 112's computing system.

Figure 2:
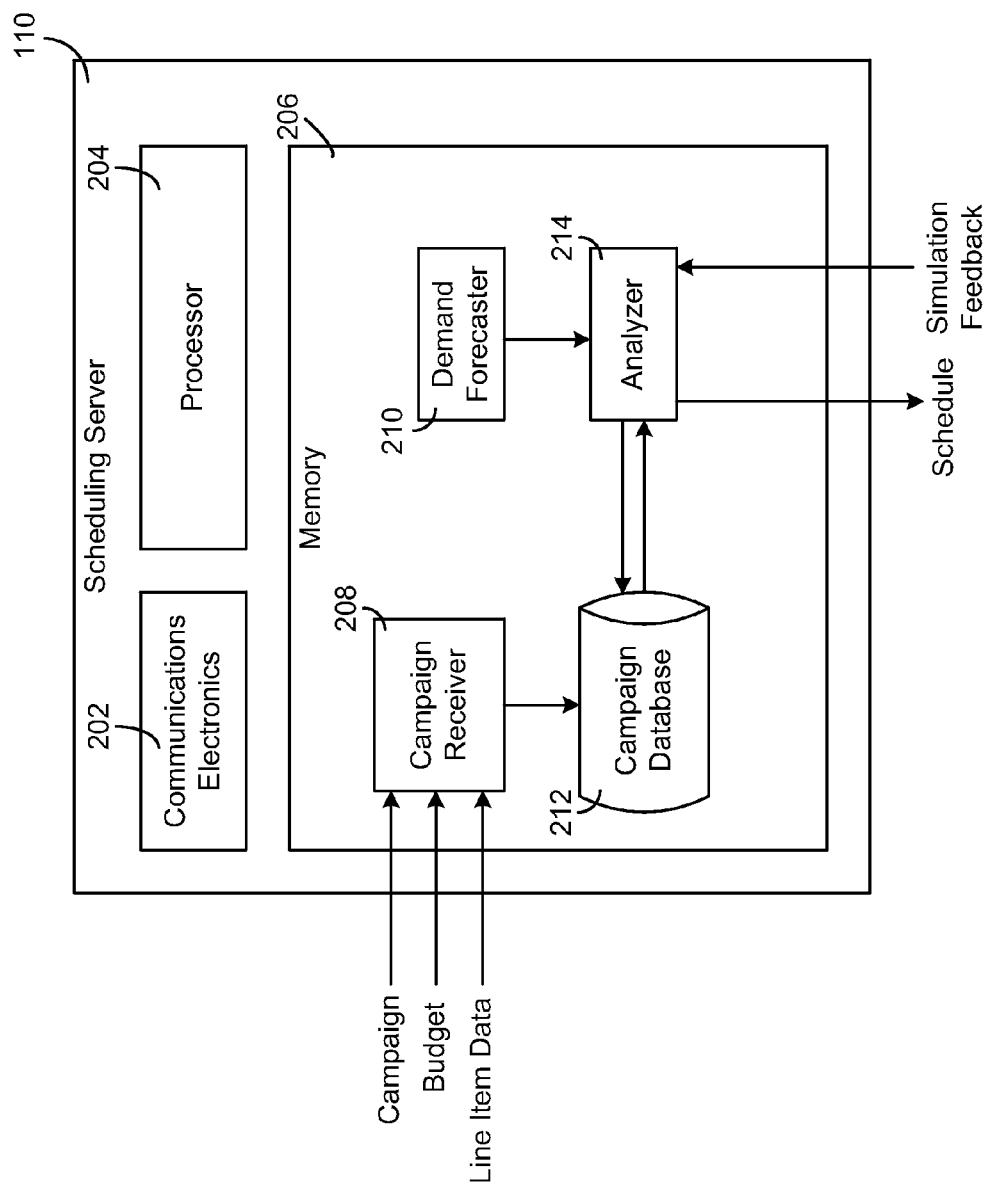
FIG. 2 is a block diagram of a scheduling server, according to an illustrative implementation.

Referring to FIG. 2, a block diagram of a scheduling server 110 is shown, according to an illustrative implementation. Scheduling server 110 may include a processing circuit configured to receive and to process line item data received from, e.g., a content publisher. Scheduling server 110 may receive budget data associated with one or more campaigns. In some implementations, scheduling server 110 may associate budget data with line item data. Scheduling server 110 may estimate the number and/or rate of impressions. The estimation of content delivery may be based on geography, time, content type, or other categories of constraints. Scheduling server 110 may generate a content delivery schedule based on the line item data, budget data, and estimated impressions. In some implementations, scheduling server 110 is part of content organizer 108 (as shown in FIG. 1). In some implementations, scheduling server 110 is part of content publisher 112. In other implementations, some elements of scheduling server 110 are in the processing circuit(s) of content organizer 108, while other elements are in the processing circuit(s) of content publisher 112. Scheduling server 110 may be configured to carry out the processes described FIGS. 5-10 and/or other processes described herein.

Scheduling server 110 is shown to include a processing circuit, including, e.g., a processor 204 and a memory 206. Processor 204 may include a microprocessor, application-specific integrated circuit (ASIC), field-programmable gate array (FPGA), etc., or combinations thereof. Processor 204 may receive line item data and budget data. Processor 204 may utilize one or more mathematical processes to generate an impressions traffic prediction. Processor 204 may utilize one or more mathematical processes to generate a content delivery schedule reconciling the requested impressions, constraints, and budget. In some implementations, processor 204 may transmit the generated schedule to a simulation server and receive feedback from the simulation server. Processor 204 may then regenerate a schedule based on the simulation feedback. For example, if the feedback is that the impressions target is not met, then the schedule can be amended to increase content delivery. Processor 204 may transmit the content delivery schedule to content server 106.

Scheduling server 110 includes memory 206. Memory 206 may store machine instructions that, when executed by processor 204, cause processor 204 to perform one or more of the operations described herein. Memory 206 may include, but is not limited to, electronic, optical, magnetic, or any other storage or transmission device capable of providing processor 204 with program instructions. Memory 206 may include a floppy disk, CD-ROM, DVD, magnetic disk, memory chip, ASIC, FPGA, read-only memory (ROM), random-access memory (RAM), electrically-erasable programmable ROM (EEPROM), erasable-programmable ROM (EPROM), flash memory, optical media, or any other suitable memory from which processor 204 can read instructions. The instructions may include code from any suitable computer-programming language such as, but not limited to, C, C++, C#, Java, JavaScript, Perl, Python and Visual Basic. Memory 206 may store campaign data, including the type and substance of content items requested to be delivered, the constraints associated with delivery, and the budget for a content provider's campaigns. This data may include line item data received from content publisher 112. Memory 206 may store data related to generating a prediction of impressions traffic based on, e.g., past content delivery. Memory 206 may store data related to generating of an optimized content delivery schedule. This data may include mathematical methods of reconciling overlapping or non-overlapping constraints on content delivery. In some implementations, data stored on memory 206 may be split across multiple devices. For example, campaign and/or budget data may be stored on budget server 102 (FIG. 1), and demand forecaster 210 (e.g., for generating traffic predictions) may be stored on content organizer 108 (FIG. 1).

Scheduling server 110 includes communications electronics 202. Communications electronics 202 may be a network interface, and the processing circuit may be configured to communicate with one or more components of system 100 (FIG. 1) via a network connection provided by communications electronics 202 For example, line item data from content publisher 112 may be received at scheduling server 110 via communications electronics 202. For example, a content delivery schedule may be transmitted to content server 106 via communications electronics 202. Communications electronics 202 can be or include wired or wireless interfaces (e.g., jacks, antennas, transmitters, receivers, transceivers, wire terminals, etc.) for conducting data communications with another system or network. For example, communications electronics 202 can include an Ethernet card and port for sending and receiving data via an Ethernet-based communications network. In another example, communications electronics 202 includes a WiFi transceiver for communicating via a wireless communications network. Communications electronics 202 may be configured to communicate via local area networks or wide area networks (e.g., the Internet, etc.).

Memory 206 includes campaign receiver 208. Campaign receiver 208 may be configured to receive and process campaign, budget, and line item data from one or more of content publishers 112, content providers 116, budget server 102, etc. For example, campaign receiver 208 may receive line item data (e.g., requested content items along with their associated impressions targets and delivery constraints) from content publisher 112. A content publisher may receive line item requests from multiple content providers. In some implementations, a content publisher 112 may transmit the received requests directly to campaign receiver 208. In some implementations, the content publisher 112 may organize or otherwise process the received requests, and transmit the processed requests to campaign receiver 208. In some implementations, scheduling server 110 (e.g., from campaign receiver 208) may serve a GUI for a content provider 116 to input line item data (e.g., what type of content, when should the content be delivered, where should the content be delivered, to whom should the content be delivered, how many impressions should the content receive). The GUI may be served to the content publisher 112 or directly to the content providers 116. The line item data may received via the content publisher 112 or directly from the content providers 116. The content publisher 112 and/or campaign receiver 208 may associate a requested line item with a content provider 116's campaign and/or budget. In some implementations, the requested line item may be an addition to an existing campaign and/or budget. In other implementations, the requested line item is part of a new campaign and/or budget, and the campaign and/or budget data is received by the scheduling server 110 along with the requested line item.

According to an illustrative implementation, campaign receiver 208 may request campaign and/or budget data from, e.g., budget server 102, when a new line item request is received. In response to the request, budget server 102 may transmit a budgeted amount of money a content provider 116 intends to spend for delivery of one or more content items. The budgeted amount may be a total amount (e.g., $1000 for 500 impressions) or may be a per-impression amount (e.g., $2 per impression). Budget server 102 may provide identifier data to enable, e.g., campaign receiver 208 to associate a requested line item with a campaign and/or budget (e.g., when a campaign and/or budget is associated with multiple items). In some implementations, campaign receiver 208 may receive only line item data (e.g., constraints associated with a content item), and budget server 102 (and/or another server associated with, e.g., content organizer 108) may provide the content item, budget, etc. Budget data may be used by scheduling server 110 to advantageously ensure that implementation of the optimized content delivery schedule provides for the amount of content delivery specified by the budget (i.e., neither under-delivery nor over-delivery).

Campaign receiver 208 (and/or another server associated with, e.g., content organizer 108) may organize or otherwise process the received line items and budgets. For example, campaign receiver 208 may receive multiple line item requests from multiple content publishers 112. Campaign receiver 208 may process the requests and associate one or more line item requests from its corresponding publisher(s) 112. For example, a sports news website and a recipes website may each work with content organizer 108 for delivery of content items. Multiple sporting goods producers may transmit multiple content requests for advertisements to be displayed on the sports news website. Similarly, multiple kitchen goods companies may transmit advertisement requests to be displayed on the recipes website. Campaign receiver 208 may receive line item data associated with the sporting goods and kitchen goods advertisements, and process the line item data so the appropriate advertisements are displayed on the website intended by the content providers 116. In some implementations, a content provider 116 (e.g., a consumer electronics producer) may request that its content be displayed by all or a portion of all publishers associated with a content organizer 108 (e.g., both the sports news website and the recipes website). In such implementations, campaign receiver 208 may designate the requested line item data for delivery with multiple publishers 112.

Campaign receiver 208 may also process requested line item data in a manner that enables, e.g., analyzer 214 (discussed in more detail below) to determine whether an overlapping constraint domain exists. The "constraint domain" describes a range of possible constraint parameter values that may be associated with a content item. An overlap exists when two or more content items share one or more of the same constraint parameter values. For example, campaign receiver 208 may receive two line item requests: campaign 1 for display in the United States from December 1 to December 5 and campaign 2 for display in all countries from December 1 to December 3. In this example, an overlapping constraint domain exists with respect to the both time and geography. The date range December 1 to December 3 is shared by both campaign 1 and campaign 2. The geography range United States is also shared by both campaign 1 and campaign 2. Implementations of the present disclosure may advantageously generate a content delivery schedule to satisfy the impressions requirements for campaign 1 and campaign 2, as well as satisfy the constraints associated with both campaigns. The data may be processed by campaign receiver 208 and/or stored by campaign database 212 such that when the constraint domain data for multiple line items is received at analyzer 214, analyzer 214 may, among other things, determine if overlapping constraints exist.

Figure 3:
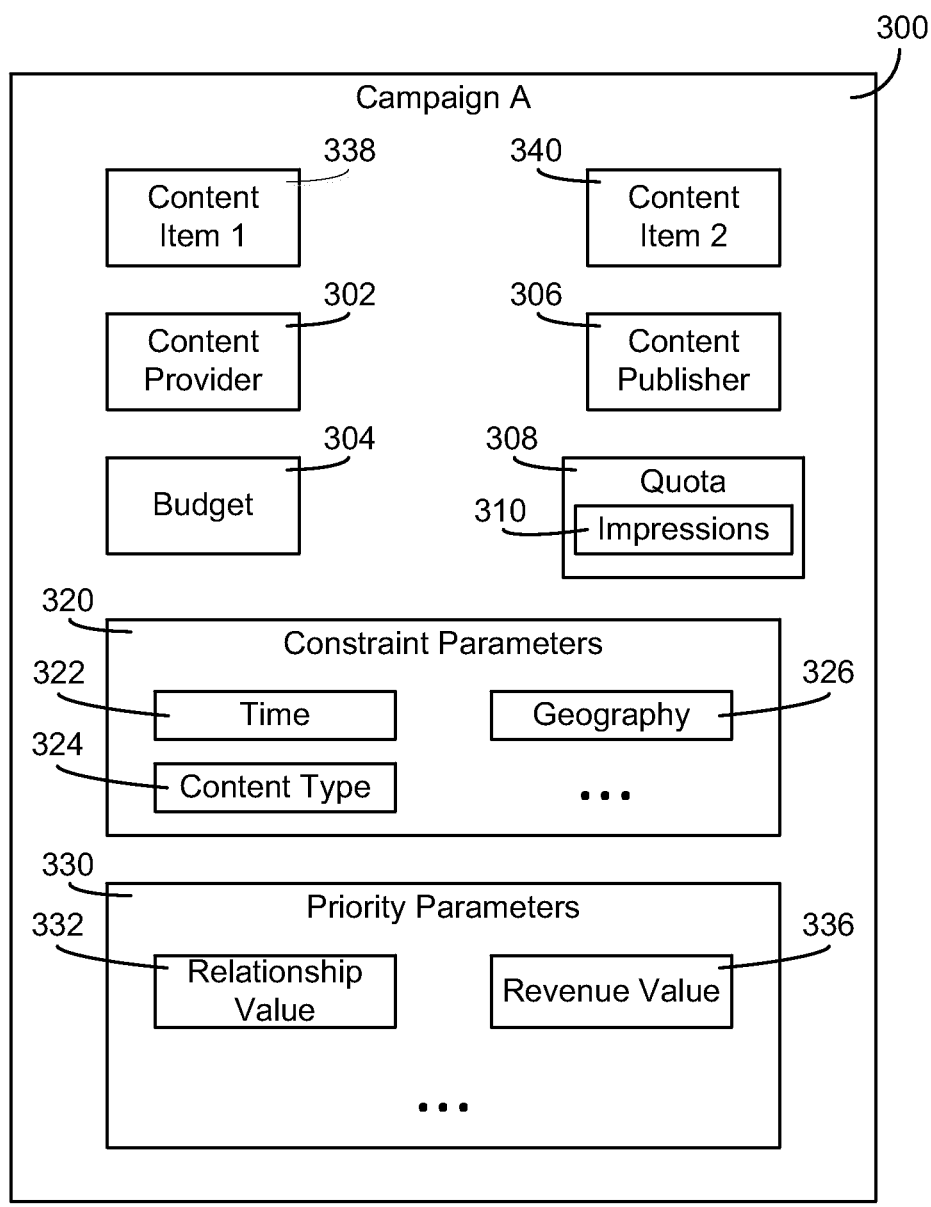
FIG. 3 is a representation of campaign data, according to an illustrative implementation.

Referring to FIG. 3, a representation of campaign data is shown, according to an illustrative implementation. Campaign receiver 208 (FIG. 2) may aggregate, associate, or otherwise process the line item, campaign, and/or budget data as shown in FIG. 3, according to an illustration implementation. According to another illustrative implementation, campaign database 212 (FIG. 2) may store aggregated, associated, or otherwise processed data as shown in FIG. 3. Campaign database 212 may include detailed historical databases (e.g., relational databases, XML databases, etc.) of relevant data. Memory 206 includes computer code modules that continuously, frequently, or infrequently query, aggregate, transform, search, or otherwise process the data maintained in the detailed databases. FIG. 3 suggests that that data is organized and sorted by campaign in database 212. In other implementations, data may be sorted by content provider, content publisher, content item, etc.

Campaign 300 includes one or more content items 338, 340 for delivery to, e.g., client computing devices. Content items 338, 340 may be associated with content provider 302. While FIG. 3 shows two content items 338, 340, in various implementations, campaign 300 may be associated with one or more than two content items. Content items 338, 340 may include text, static graphics, animation, video, rich media, etc. Content items 338, 340 may have varying display sizes (e.g., on a website), file sizes (e.g., as stored in a memory and/or transmitted to a client computing device), data formats (e.g., Flash, HTML5, etc.). In some implementations, content items 338, 340 may be interactive. For example, content items 338, 340 may solicit user responses or may include a game involving user control through one or more user input devices associated with a client computing device (e.g., mouse, keyboard, etc.). According to an exemplary embodiment, content items 338, 340 are online advertisements (e.g., advertisements for display on a webpage). In other embodiments, content items 338, 340 may be information (e.g., news), games, or other types of content. Content provider 302 may have requested that content items 338, 340 be published by content publisher 306. In various implementations, content provider 302 may have requested content items 338, 340 be published by more than one content publisher or any content publishers associated with content organizer 108.

Campaign 300 may be associated with a budget 304. Budget 304 may include updated information based on, e.g., previous display of content items 338, 340, additional input from content provider 302, etc. For example, budget 304 may have originally included a target amount of money for expenditure on display of content items 338, 340. Content items 338, 340 may have been previously displayed by publisher 306. Budget 304 may be updated (e.g., decreased) to account for the previous impressions. Thus, analyzer 214 (FIG. 2) may advantageously generate a content delivery schedule based on an actual amount of money remaining for delivery of the content items. According to an illustrative implementation, a content delivery schedule may be generated periodically (e.g., every day, every hour, etc.). Budget server 102 (FIG. 1), which may be configured to receive actual content delivery data, may push updated budget data (based on the actual content delivery data) to scheduling server 110 so that each iteration of the content delivery schedule is generated based on an up-to-date budget.

Campaign 300 may be associated with a quota 308. Quota 308 may be a metric describing an amount or frequency a content provider intends that content items 338, 340 be published by content publisher 306. According to an illustrative implementation, quota 308 includes impressions 310. Impressions 310 may be a number of times a content item is provided for display to devices 114 (FIG. 1). For example, a content provider may request that content item 338 be provided for display 500 times in the aggregate. As described below, the impression requirement may also be associated with one or more constraints (e.g., generate 500 impressions for content item 338 by serving to devices in the United States between December 1 and December 5. In other implementations, different metrics (e.g., impressions per day) for describing a provider's expected publication of content may be used. In some implementations, quota 308 may be associated with a campaign as a whole (e.g., one or more content items). In other implementations, each content item is associated with a particular quota 308.

Campaign 300 may be associated with constraint parameters 320. Constraint parameters 320 may be one or more conditions that specify how content items 338, 340 are delivered to devices 114 (FIG. 1). Constraint parameters may include temporal/time limitations 322. For example, a content provider may transmit instructions to a content publisher that a content item is to be delivered between specified hours (e.g., between 5 PM and 8 PM), for a specified duration (e.g., for three hours), on specified days (e.g., between Friday and Sunday), on specified dates (between December 1 and December 5), and/or any combination thereof. Time constraints 322 may also include instructions for delivery to repeat periodically (e.g., delivery between Friday and Sunday every week). Constraint parameters may also include geography and location-based limitations 326. For example, a content provider may transmit instructions to a content publisher that a content item is to be delivered to devices in one or more particular regions (e.g., the United States, North America, etc.) or to all devices except those in certain regions. Constraint parameters may also include content type limitations 324. For example, if a content item may be provided as a either a static image or as an animation, a content provider may transmit instructions that the content should be delivered to devices as an animation. In various implementations, other constraint types may also exist. For example, based on a user's voluntary self-identification, content may be delivered based on a user's demographics. A content organizer, content publisher, and/or content provider may have more, fewer, and/or different constraints associated with delivery of content items.

In various implementations, one content item may be associated with one or more constraint types (e.g., time and geography). According to an illustrative implementation, each content item may be associated with a constraint domain (the cross section of all constraint values for a particular content item). For example, a provider may transmit instructions that a content item is to be delivered between December 1 and December 5 (time constraint) to devices in the United States (geography constraint). When a content publisher and/or content organizer encounters requested delivery of more than one content item, an overlap may occur in the constraint domain of the multiple content items. For example, a first campaign may be requested to be delivered between December 1 and December 5 to devices in the United States, and a second campaign may be requested to be delivered between December 1 and 3 to all devices. The time period December 1 to December 3 and the geographic region United States are overlaps. In other implementations, no overlaps may exist in the constraint domain. For example, a first content item may be requested to be delivered to devices in Canada on December 3, and a second campaign may be requested to be delivered to devices in the United States on December 4-5. While these examples include two types of constraints (time and geography), in others implementations, the constraint domains associated with a content item may include more, fewer, and/or different constraint types.

Campaign 300 may be associated with one or more priority parameters. Accordingly to an exemplary embodiment, scheduling server 110 is configured to generate a content delivery schedule that satisfies the impression goals and constraints of all campaigns. "All campaigns" may include, for example, the competing campaigns for the particular content publisher in a given constraint domain. For example, each of four content providers may have requested a content publisher to publish one content item between 5 PM and 8 PM on a given day. Scheduling server 110 may determine if the impressions goals and constraints of all four content items may be satisfied. Circumstances may arise when it is infeasible or otherwise inefficient to satisfy the impressions goals and/or constraints of one or more campaigns. If not all goals and/or constraints may be met, scheduling server 110 may sacrifice one or more of the campaigns based on the priority parameters 330 associated with each campaign. According to an illustrative implementation, only impressions goals are sacrificed. That is, if a content provider transmits an impressions goal and constraints to a content publisher, the constraints are satisfied even if the impressions goal is not met. In other implementations, impressions goals and/or constraints may be sacrificed. Thus, priority parameters 330 may be utilized by scheduling server 110 to determine in which order impressions goals and/or constraints are not met. That is, priority parameters 330 may be used to determine, when not all impressions goals and/or constraints can not be satisfied, which campaigns' impressions goals should be met.

Priority parameters 330 may include relationship value 332 and revenue value 336. In some implementations, relationship value 332 may describe a preexisting relationship between a content provider and a content publisher. According to an illustrative implementation, relationship value 332 may be defined by a content publisher for each content item that a content provider requests the publisher to deliver to devices. For example, content provider A may request that two content items be published: a first content item may be assigned a high relationship value, and a second content item may be assigned a low relationship value. Content provider B may request that one content item be published, and the content item may be assigned a high relationship value. Thus, when not all of the impressions goals and/or constraints can be satisfied, the relationship values may be utilized to prioritize the first content item for provider A ahead of the second content item. Accordingly, it may be more likely that the goals and constraints of one content item from provider A and one from provider B are satisfied (as opposed to both content items from provider A and no content items from provider B). Revenue value 336 may be a monetary description associated with a content item. For example, revenue value 336 may be an amount of money a content provider agrees to expend for every one thousand impressions. In some implementations, revenue value 336 maybe a dollars-per-impression value. In some implementations, a content publisher may be choose to prioritize the satisfaction of the impressions goals for a content item that generates more revenue higher than lower-revenue-producing campaigns. Revenue value 336 may be described as a subset of relationship value 332 (i.e., relationship 332 is a more general description of relative priority between multiple campaigns). In some implementations, campaigns may be associated one or more relationship values 332 and/or revenue values 336.

Referring again to FIG. 2, memory 206 includes demand forecaster 210. Demand forecaster 210 may generate a prediction of future traffic (e.g., demand for a content items, ad requests, etc.) for a future period of time (e.g., the next hour, the next day, etc.). That is, demand forecaster 210 may predict, e.g., the number of impressions and/or the frequency of impressions for content items. Demand forecaster 210 may generate predictions based on past content demand and delivery. Past content demand and delivery data may be transmitted by content server 106 (FIG. 1) to scheduling server 110. Predictions may be based on one or more constraints. That is, predictions may be specific to e.g., geography, time/day of the week, type of content, etc. Thus, demand forecaster 210 may be configured to generate updated predictions periodically (e.g., every hour, every day, etc.) According to an illustrative implementation, demand forecaster 210 may generate an updated prediction each time scheduling server 110 generates an updated content delivery schedule. Demand forecaster 210 may also utilize past content delivery data to predict selection rates (e.g., click through rates) for particular content items. Predicted selection rates may vary based one or more parameters. For example, content with full motion video may have a higher click through rate than content with static graphics.

Memory 206 includes analyzer 214. Analyzer 214 may be configured to generate a content delivery schedule that meets the impressions goals and constraints of one or more campaigns. According to an illustrative implementation, analyzer 214 may generate a different content delivery schedule for each content publisher associated with a content organizer. The schedule may include instructions describing the delivery of each of one or more content items requested to be delivered along with other content delivered by the content publisher. Analyzer 214 may combine knowledge of current and future campaigns with predictions about future content requests (i.e., traffic) to generate a content delivery schedule. Analyzer 214 may receive current and future campaign data from campaign database 212. Analyzer may receive predicted traffic data from demand forecaster 210. Analyzer 214 may transmit the content delivery schedule to content server 106, which in turn may deliver the content items based on the schedule.

Analyzer 214 may use one or more mathematical methods to generate a content delivery schedule. For example, analyzer 214 may use a bipartite maximum flow or non-chronological simulator. A non-chronological simulator may process in a random order (instead of chronologically), which advantageously enables optimization across time. Each campaign may be assigned a satisfaction index (SI). SI may be a scalar quantity that tracks how well the campaign is delivering. In one implementation, SI is defined as:

$$SI = (delivered\_thus\_far/campaign\_goal) * (total\_impressions\_to\_simulate/impressions\_simulated\_thus\_far)$$

Values below 1.0 may indicate that the campaign is under-delivering, and values above 1.0 may indicate that the campaign is over-delivering. Analyzer 214 may process all predicted traffic, assigning each impression to the eligible campaign with the lowest SI. (Initially, impressions_simulated_thus_far is zero, and SI is undefined. An arbitrary decision may be made in the initial case.) Periodically (e.g., each hour, each day, etc.) and for each campaign, the number of assigned impressions is recorded. This data may then be provided to content server 106 in the form of an optimized delivery plan.

Analyzer 214 may be implemented using bipartite maximum flow. Bipartite maximum flow algorithms are used to solve a class of problems where N classes of things need to be efficiently allocated into M categories. For content delivery, the N classes may be the types of impressions, i.e., groupings of impressions. Impressions fall into the same group if they are eligible for the same set of campaigns. The M categories may be campaigns. Each of the N classes may be applicable only for a different subset of the M categories. One goal of the bipartite maximum flow method may be to utilize as many of the objects as possible. Each of the N classes may have a limited quantity of objects available. Each of the M categories may have a maximum number of objects assigned to it. The category limits are the campaign goals. An optimized content delivery schedule is generated by making efficient use of the impressions to achieve the campaign goals.

Formally, bipartite maximum flow may be described as the full space of inventory (i.e., campaigns), being subdivided until each piece (i.e., region) is a subset of all campaigns. Each campaign may be composed of many regions. Regions may be contained in multiple campaigns. For each campaign, a node is created in the residual graph describing the problem. The campaign nodes are connected to the source. Each edge has the capacity of the impressions goals of the campaign. A node is created for each region. Each of the nodes is connected to all campaign nodes that contain it with edges with infinite capacity. Each region is connected to the sink with an edge capacity reflecting the estimated traffic (inventory) for the node. The maximum flow may then be calculated. The actual flow on each of the internal edges connecting the campaigns and the regions reflects the optimal delivery for a campaign in that region. This may be recorded as the optimized content delivery plan. In other implementations, linear programming and/or other mathematical methods may be implemented by analyzer 214 to generate an optimized content delivery schedule.

Analyzer 214 may be configured to optimize for any utility function describing the delivery of content items to devices. According to an illustrative implementation, analyzer 214 is configured to satisfy the impressions goals and constraints of as many campaigns as possible. If not all goals and/or constraints may be met, publisher-provided priority (e.g., relationship value 332 of FIG. 3) may be used to decide which campaigns' goals are sacrificed. In some implementations, a campaign with a lower priority parameter may be sacrificed ahead of a campaign with a higher priority parameter. Priority parameters may be received per campaign. As between campaigns with equal priority values, revenue (e.g., revenue value 336 of FIG. 3) may be used to determine which campaign(s) are sacrificed. In some implementations, the impressions goals of a campaign with higher revenue may be sacrificed only after a campaign with lower revenue is sacrificed. The revenue parameter may be cost per one thousand impressions or another measure of costs that a content provider has agreed to incur for delivery of the content item. As between campaigns with equal revenue parameters, a rate of selection of the served content (e.g., click through rate) may be used to decide which campaign(s) to sacrifice. According to an illustrative implementation, content items may include a hyperlink to a designated URL. A user's selection of a content item (e.g., depressing a mouse button, tapping a touch screen, etc.) may cause the user's computing device to retrieve data associated with the designated URL. In some implementations, content that is more likely to be selected (as opposed to only viewed) is sacrificed only after content that is less likely to be selected has been sacrificed. This may advantageously increase the utility of served content by serving content that is more likely to be selected. In various implementations, other criteria and/or orders of such criteria for choosing which campaigns goals to sacrifice are used.

In some implementations, analyzer 214 may transmit a content delivery schedule to a simulation server (e.g., simulation server 104). Simulation server 104 may simulate the expected content delivery based on the schedule generated by analyzer 214. In some implementations, simulation server 104 may rerun the actual content requests for a past period of time that corresponds to the period of time during which the content items of the generated schedule are being delivered. For example, if the schedule includes content items to be delivered between December 1 and December 5, simulation server 104 may implement the schedule using the traffic from December 1 through December 5 of the previous year. The simulation server may generate metrics to describe the efficacy of the generated schedule. For example, simulation server 104 may be configured to determine how many impressions goals were satisfied, etc. The metrics data may be transmitted to analyzer 214 and used by analyzer 214 to modify the content delivery schedule. Content delivery may be simulated by simulation server 104 zero, one, or more times prior to a schedule being delivered to content server 106 for implementation.

Figure 4:
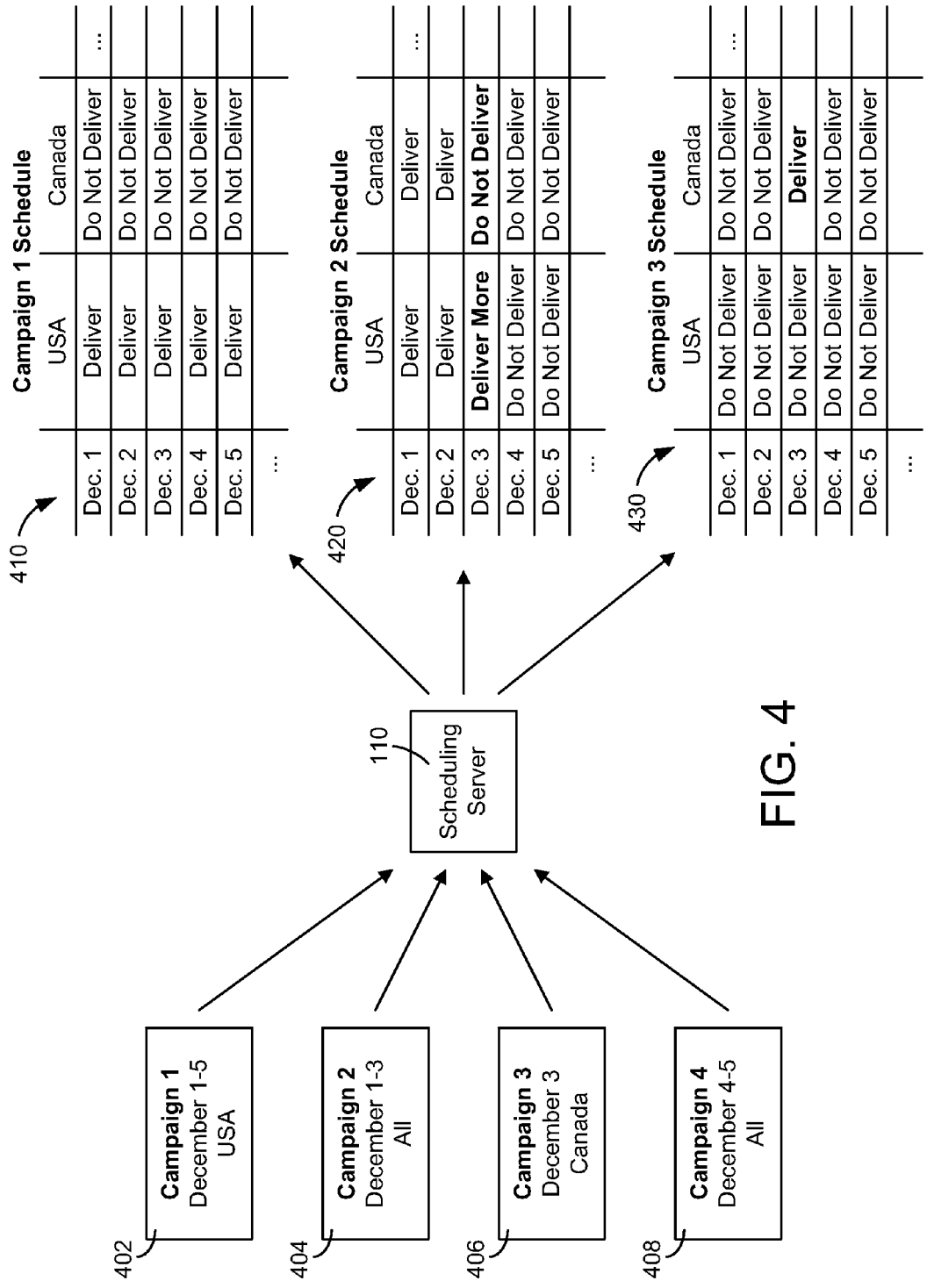
FIG. 4 is a diagram illustrating how a content delivery schedule is generated, according to an illustrative implementation.

Referring to FIG. 4, a diagram illustrating how a content delivery schedule is generated is shown, according to an illustrative implementation. The processes involved in generating delivery schedules 410, 420, and 430 may be carried out, in general, by scheduling server 110 of FIG. 1 and, specifically, in one implementation, by analyzer 214 of FIG. 2. FIG. 4 is shown to include campaigns 402, 404, 406, 408. Campaigns 402, 404, 406, and 408 may include content items (second content) requested to be delivered with other content (first content) served by a content publisher. One or more content providers (e.g., four content providers) may have requested that the campaigns 402, 404, 406, and 408 be delivered to client devices. Campaigns 402, 404, 406, and 408 may each be associated with an impressions goal. In the implementation of FIG. 4, campaigns 402, 404, 406, and 408 are associated with time and geography constraints. (In other implementations, campaigns may be associated with fewer, more, or different constraint types.) A content provider may request that campaign 402 be delivered between December 1 and December 5 to devices in the United States. Campaign 404 is requested to be delivered to all devices between December 1 and December 3. Campaign 406 is requested to be delivered to devices in Canada on December 3. Campaign 408 is requested to be delivered to all devices between December 4 and December 5. Between the four campaigns, overlaps exist in the time and geography constraints.

Analyzer 214 (FIG. 2) may compute different delivery targets to reconcile the different overlaps. For example, analyzer 214 may determine (e.g., using bipartite maximum flow, non-chronological simulator, etc.) that campaign 406 needs all matching inventory on December 3 in order to meet its impressions goals. That is, campaign 406 may meet its impressions goals only if campaign 406 (and no other campaigns) are served in Canada on December 3. This is shown in schedule 430. Schedule 430 indicates that content server 106 (FIG. 1) is instructed to deliver campaign 406 in Canada on December 3. (Schedule 420, for campaign 404, shows that campaign 404 is not served in Canada on December 3.) Campaign 406's delivery requirement affects campaigns with overlapping constraints. For example, campaign 404 overlaps with campaign 406 with respect to time and geography. Because only campaign 406 is served to devices in Canada on December 3, campaign 404 may need to be served more in geographical regions other than Canada (e.g., the United States) on December 3. This is shown in schedule 420. Schedule 420 includes that campaign 404 is delivered more in the United States on December 3 so that campaign 404 may also satisfy its impressions goals. Similarly, the increased delivery of campaign 404 in the United States may affect delivery of campaign 402 (not shown). Campaign 408, which does not include overlapping time constraints, may not be affected by the adjusted delivery of campaigns 402, 404, and 406. Schedules 410, 420, and 430 may be delivered to content server 106 as instructions executable by content server 106 (FIG. 1).

Figure 5:
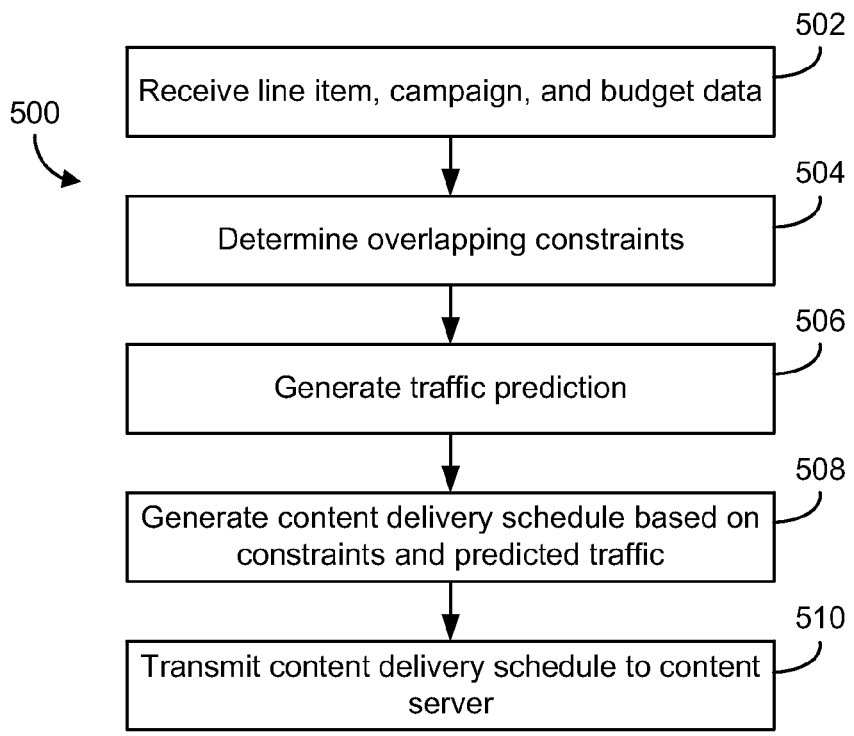
FIG. 5 is a flow diagram of a process for generating a content delivery schedule, according to an illustrative implementation.

Referring to FIG. 5, a flow diagram of a process 500 for generating a content delivery schedule is shown, according to an illustrative implementation. Process 500 may be carried out by, e.g., scheduling server 110 (FIG. 2). Process 500 may be a high level flow diagram of processes described in more detail in FIGS. 7-10.

Process 500 includes receiving line item, campaign, and budget data (502). Line item data may be received from content publisher 112 (FIG. 1). Line item data includes impressions goals, constraint parameters, and/or priority parameters associated with one or more content items. Budget data may be received from budget server 102 (FIG. 1). Budget data includes an amount of money to be spent on delivery of one or more content items. Campaign data may be received from content publisher 112, budget server 102, and/or other servers associated with content organizer 108 (FIG. 1). Process 500 includes determining whether an overlap exists in the constraint domain for two or more campaigns (504). Content organizer 108 may evaluate the constraints associated with multiple campaigns (e.g., hundreds, thousands, etc.) that are requested to be delivered with other content served by a content publisher 112. An overlap may exist when two or more campaigns share a constraint parameter value (e.g., serve content A in North America and serve content B in Canada; Canada is a shared constraint parameter). When content publisher 112 is requested to serve only one campaign, an overlap in the constraint domain is not likely to exist. Process 500 includes generating a traffic prediction (e.g., expected content demand and content delivery) for a future period of time (506). The traffic prediction may be based on past content demand and delivery. Process 500 includes using the predicted traffic and constraint parameters to generate a content delivery schedule (508). The content delivery schedule may include instructions for the delivery of a particular campaign by a content server 106. The goal of the generated content delivery schedule may be to satisfy the impressions goal of a campaign. One or more mathematical methods may be used to generate a content delivery schedule (e.g., bipartite maximum flow, non-chronological simulator, etc.). Some exemplary methods are described in more detail in the discussion of FIGS. 7-10. Process 500 includes transmitting the content delivery schedule to a content server (510). The content delivery schedule may include instructions executable by a processor associated with the content server 106. When the content server 106 receives a request for content, content server 106 may serve content based on the schedule.

Figure 6:
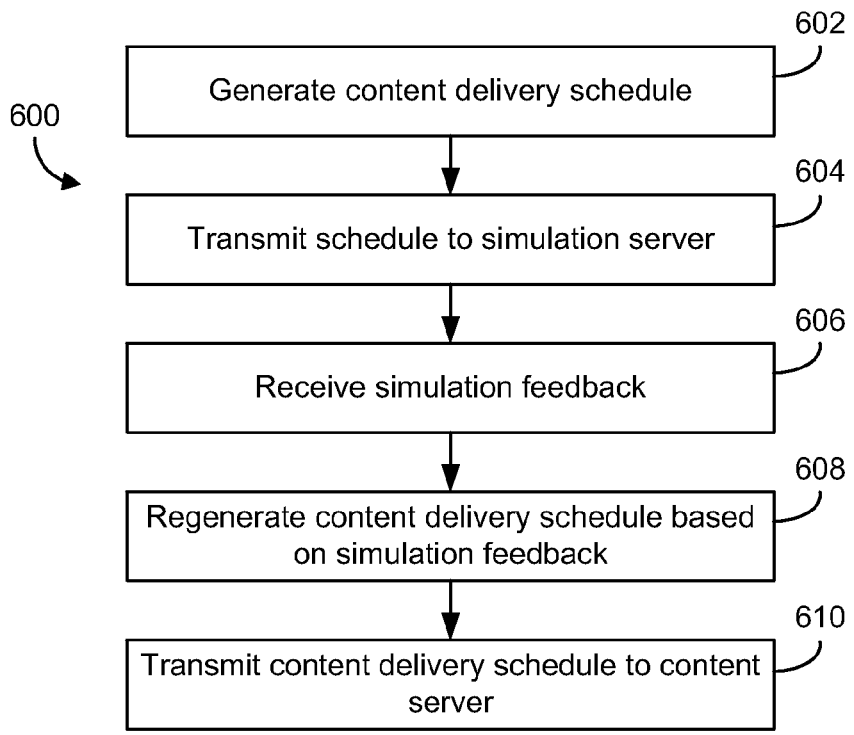
FIG. 6 is a flow diagram of a process for utilizing a simulation server to update a content delivery schedule, according to an illustrative implementation.

Referring to FIG. 6, a flow diagram of a process 600 for utilizing a simulation server to update a content delivery schedule is shown. According to an illustrative implementation, process 600 may be added to process 500 (FIG. 5). Process 600 may be carried out by scheduling server 110 (FIG. 2). Process 600 includes generating a content delivery schedule (602). Step 602 may be substantially similar to step 508 of process 500 (FIG. 5). Process 600 includes transmitting the content delivery schedule to a simulation server (604). Simulation feedback may be received from the simulation server (606). Simulation feedback may include an indication of the predicted success (e.g., satisfaction of impressions goals and/or constraints) for one or more campaigns. Process 600 includes regenerating the content delivery schedule based on the simulation feedback (608). For example, if the simulation feedback indicates that content delivery schedule results in over-delivery of a particular campaign, the delivery schedule may be updated to decrease delivery. Steps 604-608 may be repeated multiple times. Process 600 includes transmitting the content delivery schedule to the content server (610) to be implemented.

Figure 7:
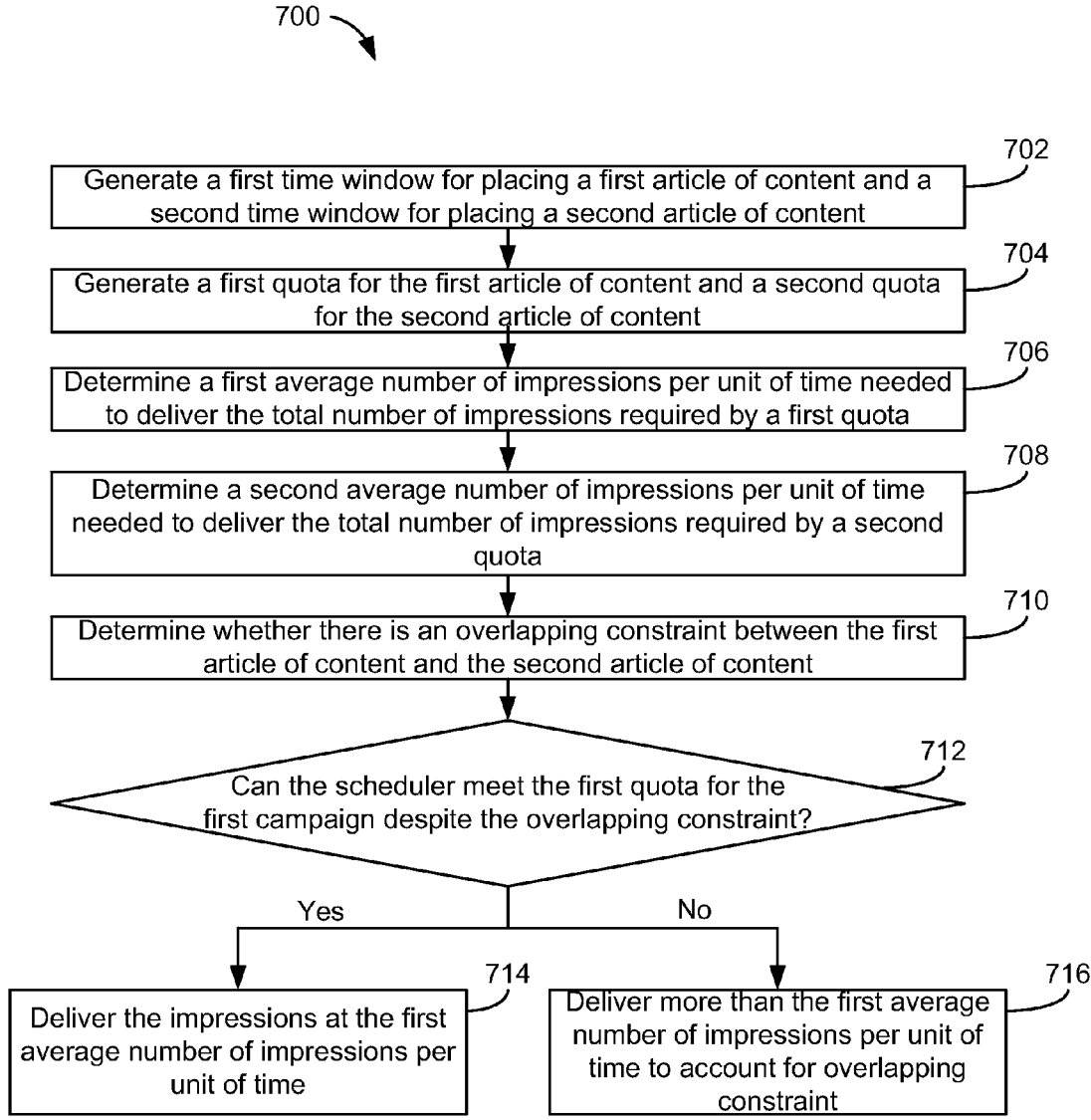
FIGS. 7-10 are flow diagrams of processes for generating a content delivery schedule, according to illustrative implementations.

Referring to FIG. 7, a flow diagram of a process 700 for generating a content delivery schedule is shown, according to an illustrative implementation. Process 700 may be carried out by, e.g., scheduling server 110 (FIG. 2). Process 700 may be a more detailed flow diagram of steps 504-508 of process 500 (FIG. 5). Process 700 may describe circumstances in which two campaigns are compared. A similar process may be carried by scheduling server 110 in comparing tens, hundreds, and thousands of campaigns.

Process 700 includes generating a first time window and a second time window for placing or otherwise delivering a first article of content and a second article of content, respectively (702). The first article of content may be associated with a first campaign, and the second article of content may be associated with a second campaign. The time windows may be based on constraint parameters associated with the content items. In the implementation of FIG. 7, content items are associated with time constraints. The time windows may include a start time and an end time. The time window may describe a period during which a content provider intends that the content items be delivered to, e.g., client computing devices. According to an illustrative implementation, a content provider may transmit instructions specifying the time window. The time window may be "generated" by, e.g., a scheduling server in the sense that the scheduling server generates instructions executable by a content server (a content delivery schedule or content delivery plan) relating to, e.g., the start time, the end time, the total duration, etc. In other implementations, the articles of content may be associated with different or multiple constraint types (e.g., geography, time and geography, etc.). In such implementations, the articles of content may be associated with, e.g., a geographical delivery region in addition to or in lieu of a time window. In general, the cross section of constraint parameters associated with a content item forms a constraint region. Thus, a scheduling server, e.g., may generate a constraint region for a first and second article of content.

Process 700 includes generating a first quota for the first article of content and a second quota for the second article of content (704). The quota may be, e.g., the impressions that a content provider intends that a content item receive. According to an illustrative implementation, a content provider may transmit instructions specifying the quota. The quota may be "generated" by, e.g., a scheduling server in the sense that the scheduling server generates instructions executable by a content server (a content delivery schedule or content delivery plan) relating to, e.g., the total impressions and/or minimum impressions per time period.

Process 700 includes determining a first average number of impressions per unit of time needed to deliver a total number of impressions required by the first quota (for a first campaign and/or first article of content) (706). The total number of impressions may be set by the content provider, and the average number of impressions per unit of time may be calculated by analyzer 214 (FIG. 2). For example, if a content provider has requested five hundred impressions over the course of five days, an average-per-unit-time delivery may be one hundred impressions per day. A second average number of impressions to deliver per unit time (for a second campaign and/or a second article of content) may also be determined (708). Process 700 initially assumes that delivery using the first average and second average for a specified period of time will result in satisfaction of the impressions goals for the first and second campaigns or articles of content.

Process 700 includes determining whether there are overlapping constraints associated with the first article of content and second article of content (710). This may occur, for example, if the first article should be published May 10, 2012 through May 20, 2012, and the second article should be published May 18, 2012 through May 22, 2012. The period of May 18, 2012 through May 20, 2012 is an overlapping constraint. While this overlap relates to the time/date when the content is delivered, the overlapping constraints may be one or more other constraint types (e.g., geography, content type, etc.).

Process 700 includes determining, notwithstanding this overlapping constraint, whether the content server 106 (FIG. 1) can publish the required number of impressions for both the first and second articles by publishing the content at the average rate per unit of time (712). Content server 106 may be able to deliver the required number of impressions for both articles under certain conditions. For example, if enough viewers are viewing the publisher's publication (e.g., the traffic is high enough), the publisher may be able to deliver the requested number of impressions notwithstanding the time overlap. Similarly, if the content server 106 can publish both articles of the content at the same time, the overlapping time might not affect the publisher's ability to deliver the required number of impressions. This may arise, e.g., when the publisher is able to publish multiple content items simultaneously. For example, a website publisher may have space on its website for a 300 pixel×250 pixel banner and a 160 pixel× 600 pixel static graphic banner. If the first campaign includes a 300 pixel×350 pixel banner and the second campaign includes a 160 pixel×600 pixel banner, then both content items may be published simultaneously. Thus, content may be delivered at the average number of impressions per unit time (714). If analyzer 214 (FIG. 2) predicts the content server 106 will not be able deliver the required number of impressions for both campaigns, analyzer 214 may generate schedule data to deliver more than the average number of impressions per unit time (716). This may make up for the under-delivery that occurs during the overlapping constraint region. The non-overlapping constraint region describes the constraint domain (i.e., cross section of constraint parameter values) for a particular campaign that is not shared with another campaign. Thus, over-delivering in the non-overlapping constraint region and under-delivering in the overlapping region may aggregately result in meeting a campaign's impressions goal.

Figure 8:
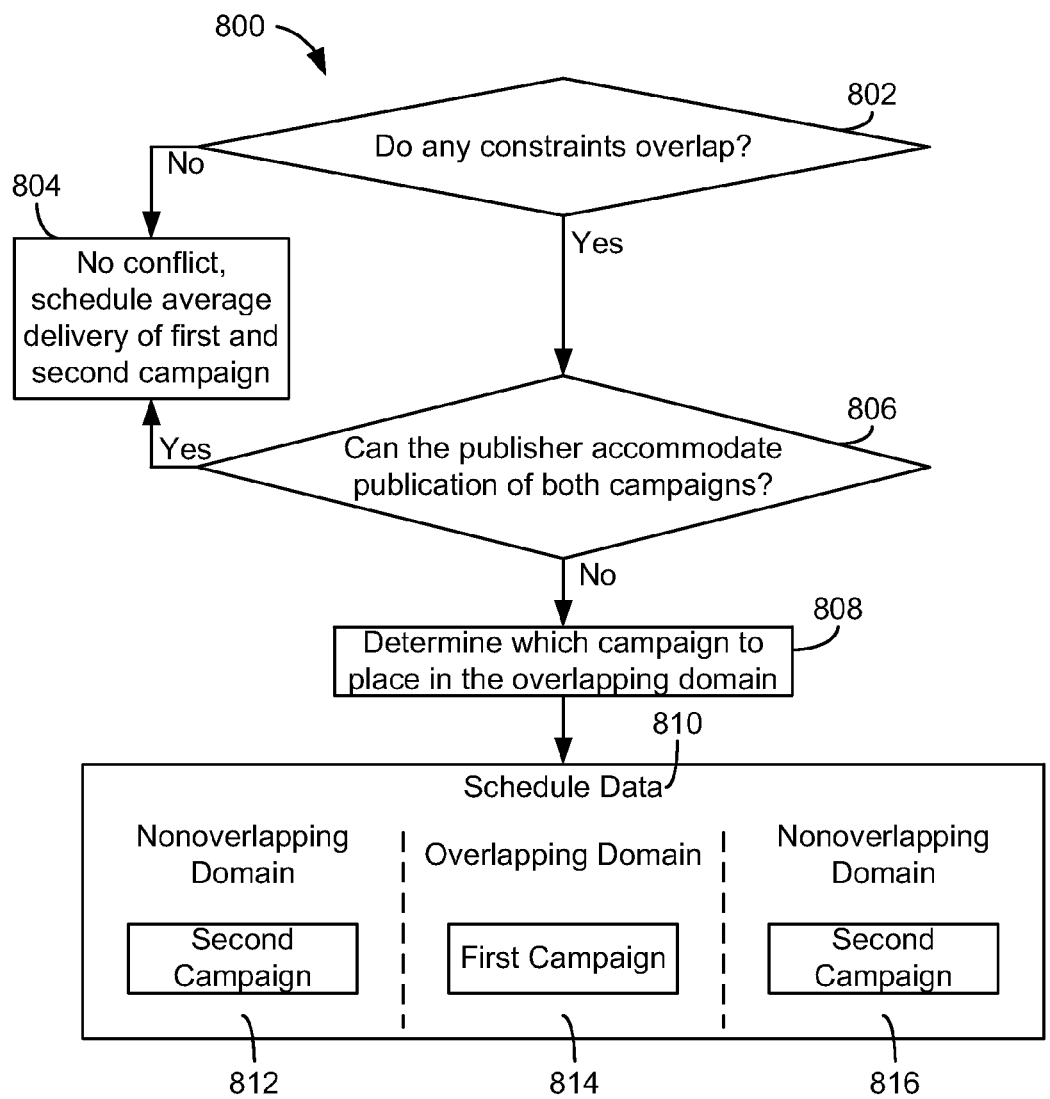

Referring to FIG. 8, a flow diagram of a process 800 for generating a content delivery schedule is shown, according to an illustrative implementation. Process 800 may be carried out by, e.g., scheduling server 110 (FIG. 2). Process 800 may be a more detailed flow diagram of steps 504-508 of process 500 (FIG. 5). Process 800 may describe circumstances in which two campaigns are compared. A similar process may be carried by scheduling server 110 in comparing tens, hundreds, and thousands of campaigns. A first campaign and a second campaign may each be associated with constraint domains (e.g., restriction on content delivery relating to time, geography, etc.). Process 800 includes determining if the constraint domains of the first and second campaign overlap (802). If not, then analyzer 214 (FIG. 2) may be configured to schedule average-per-unit-of-time delivery of the first and second campaign (804). If there is an overlap, then analyzer 214 may determine if the publisher can accommodate publication of both campaigns (806). This may arise in the circumstances described in the discussion of step 708 of process 700 (FIG. 7). If so, then average-per-unit-of-time delivery of the first and second campaigns may be scheduled (804). If not, analyzer 214 may determine which content to publish in the overlapping domain (808). Analyzer 214 may utilize one or more mathematical processes to determine which content to publish in the overlapping and non-overlapping domains. In the implementation of FIG. 8, analyzer 214 generates schedule data 810 that includes publishing the first campaign in the overlapping domain 814, publishing a portion of the required impressions for the second campaign in the non-overlapping domain 812, and publishing the remainder of the required impressions for the second campaign in non-overlapping domain 816. For example, a second campaign may be requested to be delivered to devices in Canada on December 2. A first campaign may be requested to be delivered to devices in North America between December 1 and December 3. The overlapping constraint domain includes December 2 and Canada. Analyzer 214 may determine that only the first campaign should be delivered on December 2 in Canada (i.e., the overlapping domain 814). Analyzer 214 may schedule delivery of the second campaign for, e.g., United States, Mexico, and other countries in North America (other than Canada) for December 1 (non-overlapping domain 812) and December 3 (non-overlapping domain 816). In other implementations, analyzer 214 may generate different schedule 810. The content delivery schedule generated by analyzer 214 may be transmitted to content server 106 (FIG. 1).

Figure 9:
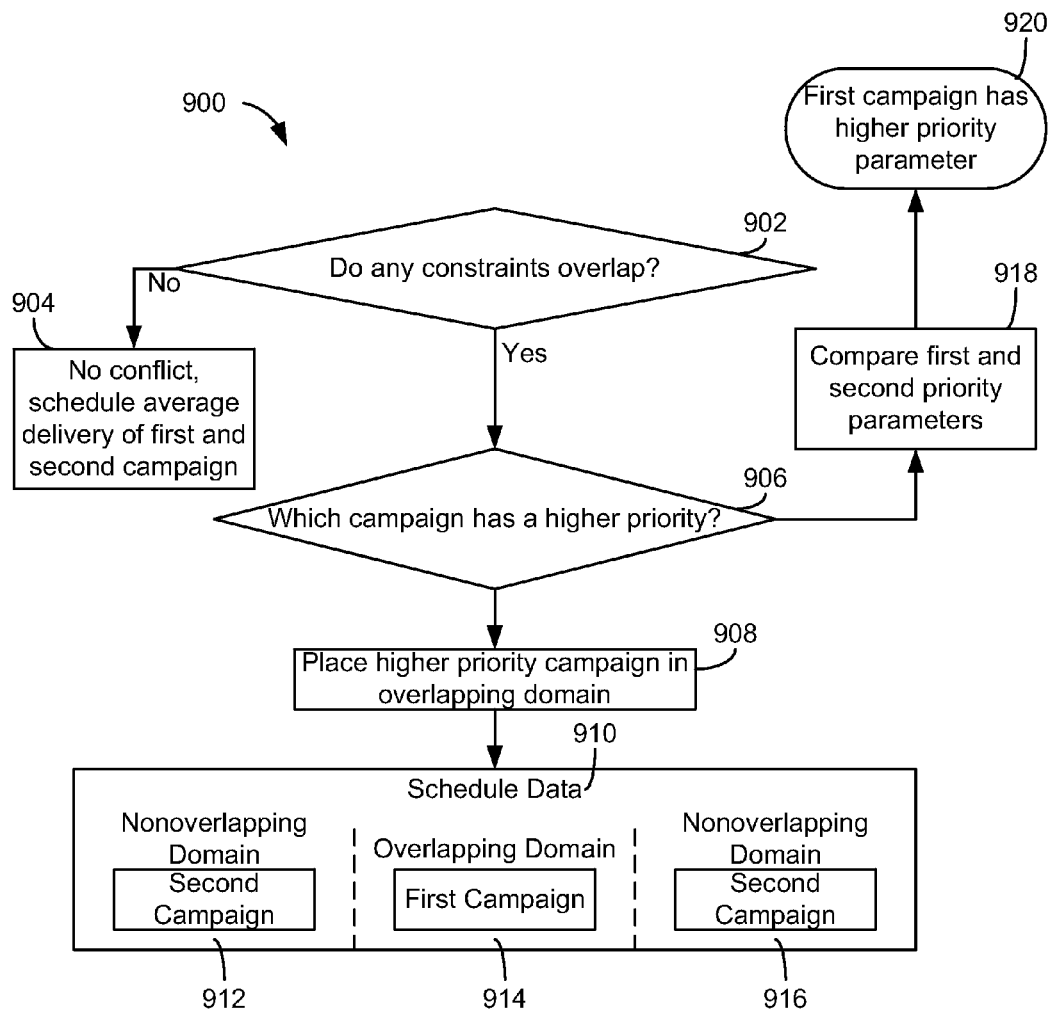

Referring to FIG. 9, a flow diagram of a process 900 for generating a content delivery schedule is shown, according to an illustrative implementation. Process 900 may be carried out by, e.g., scheduling server 110 (FIG. 2). Process 900 may be a more detailed flow diagram of steps 504-508 of process 500 (FIG. 5). Process 900 may describe circumstances in which two campaigns are compared. A similar process may be carried out by scheduling server 110 in comparing tens, hundreds, and thousands of campaigns. A first campaign and a second campaign may each be associated with constraint domains (e.g., restriction on content delivery relating to time, geography, etc.). The first campaign and second campaign may also be associated with one or more priority parameters. The priority parameters may include, for example, relationship value 332 (FIG. 3) and/or revenue value 336 (FIG. 3). The priority parameters may be assigned by, e.g., a content publisher or may be calculated by, e.g., a content organizer Process 900 may be used when, e.g., analyzer 214 has determined that it is infeasible to satisfy the impressions goals of both the first campaign and the second campaign.

Process 900 includes determining if the constraint domains of the first and second campaign overlap (902). If not, then analyzer 214 (FIG. 2) may be configured to schedule average-per-unit-of-time delivery of the first and second campaigns (904). If there is an overlapping constraint region, then process 900 may determine which campaign has higher priority (906). Analyzer 214 may compare the priority parameters associated with the first and second campaign. Analyzer 214 may determine which parameter value is higher or lower. Analyzer 214 may receive instructions associated with the priority parameters to determine whether a higher or lower priority parameter is indicative of higher priority. In the implementation of FIG. 9, the first campaign has a higher priority (920). Thus, analyzer 214 may generate schedule data 910 that places the higher priority campaign in the overlapping domain (908). By placing the first campaign in the overlapping domain 914, analyzer 214 may have assured that at least the impressions goal for the first campaign is met. The second campaign is placed in non-overlapping domains 912, 916. Because it was determined to have a lower priority parameter, the second campaign's impressions goal may not be satisfied.

Figure 10:
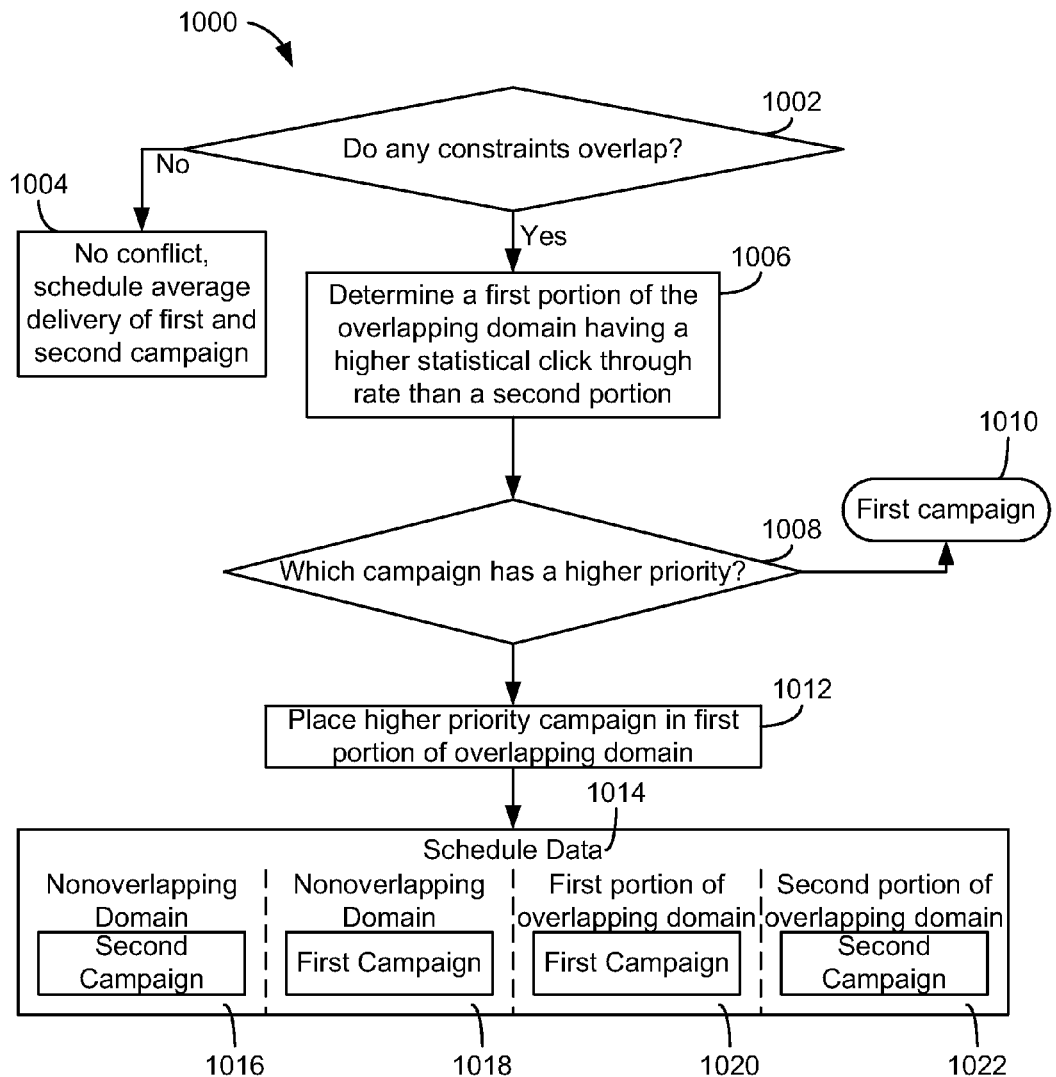

Referring to FIG. 10, a flow diagram of a process 1000 for generating a content delivery schedule is shown, according to an illustrative implementation. Process 1000 may be carried out by, e.g., scheduling server 110 (FIG. 2). Process 1000 may be a more detailed flow diagram of steps 504-508 of process 500 (FIG. 5). Process 1000 may describe circumstances in which two campaigns are compared. A similar process may be carried by scheduling server 110 in comparing tens, hundreds, and thousands of campaigns. A first campaign and a second campaign may each be associated with constraint domains (e.g., restriction on content delivery relating to time, geography, etc.). The first campaign and second campaign may also be associated with one or more priority parameters (e.g., relationship value 332 and/or revenue value 336 of FIG. 3). Process 1000 may utilize predictions regarding content selection rates (e.g., click through rates) from demand forecaster 210 (FIG. 2).

Process 1000 includes determining if the constraint domains of the first and second campaign overlap (1002). If not, then analyzer 214 (FIG. 2) may be configured to schedule average-per-unit-of-time delivery of the first and second campaigns (1004). If there is an overlapping domain, process 1000 includes identifying a portion of the overlapping domain that has a higher click through rate than a second portion. For example, demand forecaster 210 may determine that content served between 5 PM and 8 PM has a higher click through rate than content served during other times. Process 1000 includes determining which campaign has higher priority (1008). Step 1008 may be substantially similar to steps 906 and 918 of process 900 (FIG. 9). In the implementation of FIG. 10, the first campaign is determined to have higher priority (1010). Process 1000 includes placing the higher priority content in the first portion of the overlapping domain (i.e., the portion determined to have a higher click through rate) (1012). Schedule data 1014 may include serving the higher priority content in the first portion of the overlapping domain 1020 so that the first campaign (which has a higher priority) has a higher likelihood of satisfying its impressions goals. The second campaign is scheduled in the second portion of the overlapping domain 1022 (which has a lower click through rate that the first portion 1020). Schedule data 1014 is also shown to include that analyzer 214 has scheduled the second campaign to be delivered in non-overlapping domain 1016 and the first campaign to be delivered in the non-overlapping domain 1018.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources.

The term "client or "server" includes all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code embodied on a tangible medium that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD- ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos, and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels," etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A non-transitory computer readable storage media storing processor-executable instructions, which, when executed by a server comprising the storage media and one or more processors, cause the one or more processors to:
   generate a first time window for publishing a first article of content, the first time window comprising a first start time and a first end time;
   generate a first quota indicating a first total number of publications of the first article of content;
   generate a second time window for publishing a second article of content, the second time window comprising a second start time and a second end time, wherein the first time window and the second time window share a period of overlapping time;
   generate a second quota indicating a second total number of publications of the second article of content;
   determine, for the first article of content, a first publication rate equal to a first average number of publications per unit of time needed to satisfy the first quota;
   determine, for the second article of content, a second publication rate equal to a second average number of publications per unit of time needed to satisfy the second quota;

determine whether the scheduler can satisfy the first quota by publishing the first article of content at the first publication rate during the period of overlapping time; and when the scheduler can satisfy the first quota by publishing the first article of content at the first publication rate during the period of overlapping time, instruct a content placement server to publish the first article of content at the first publication rate, and otherwise when the scheduler cannot satisfy the first quota by publishing the first article of content at the first publication rate during the period of overlapping time, instruct the content placement server to publish the first article of content at a third publication rate higher than the first publication rate.

2. The storage media of claim 1, further comprising instructions that, when executed, cause the one or more processors to:

determine the period of overlapping time between the first time window for publishing the first article of content and the second time window for publishing the second article of content;

determine a period of non-overlapping time between the first time window for publishing the first article of content and the second time window for publishing the second article of content; and generate schedule data instructing the content placement server to publish the first article of content at a fourth publication rate higher than the first publication rate during the period of non-overlapping time such that the first article of content is published at least as many times as the first total number of publications indicated by the first quota.

3. The storage media of claim 1, further comprising instructions that, when executed, cause the one or more processors to determine which content to schedule for publication during the period of overlapping time.

4. The storage media of claim 1, further comprising instructions that, when executed, cause the one or more processors to instruct the content placement server to publish the first article of content during the period of overlapping time.

5. The storage media of claim 1, further comprising instructions that, when executed, cause the one or more processors to:

identify a portion of the period of overlapping time that has a higher forecasted click through rate as compared to an average forecasted click through rate of the period of overlapping time;

determine a higher priority content from among the first article of content and the second article of content; and schedule the higher priority content to be published during the identified portion of time having the higher forecasted click through rate.

6. The storage media of claim 5, wherein the first article of content is provided by a first content provider and the second article of content is provided by a second content provider, the instructions further comprising instructions that, when executed, cause the one or more processors to: determine the higher priority content based on a comparison between a first preexisting relationship between the first content provider and a content publisher and a second preexisting relationship between the second content provider and the content publisher.

7. The storage media of claim 6, further comprising instructions that, when executed, cause the one or more processors to generate a campaign database comprising:

a first relationship value quantifying a first quality of the first preexisting relationship involving the first content provider and the content publisher; and a second relationship value quantifying a second quality of the second preexisting relationship involving the second content provider and the content publisher.

8. The storage media of claim 7, further comprising instructions that, when executed, cause the one or more processors to:

determine a greater relationship value between the first and second relationship values; and determine the higher priority content based on which of the first article of content and the second article of content corresponds to the greater relationship value.

9. The storage media of claim 7, further comprising instructions that, when executed, cause the one or more processors to:

determine the higher priority content by comparing a first dollars per impression value of the first article of content and a second dollars per impression value of the second article of content; and determine the higher priority content based on which of the first article of content and the second article of content corresponds to the higher dollars per impression value.

10. The storage media of claim 1, further comprising instructions that, when executed, cause the one or more processors to:

determine which of the two articles of content has a higher priority content and a lower priority content from among the first article of content and the second article of content using ranking logic;

determine a first portion and a second portion of the overlapping time between the first time window for publishing the first article of content and the second time window for publishing the second article of content, wherein the first portion has a higher expected click through rate average than the second portion; and instruct the content placement server to schedule the higher priority content for publication during the first portion and the lower priority content for publication during the second portion.

11. The storage media of claim 1, further comprising instructions that, when executed, cause the one or more processors to:

determine, for the first article of content, the third publication rate equal to an average number of publications per unit of time needed to satisfy the first quota during the first time window less the period of overlapping time; and instruct the content placement server to publish the first article of content at the third publication rate during a portion of the first time window that does not overlap with the second time window.

12. The storage media of claim 1, further comprising instructions that, when executed, cause the one or more processors to generate a traffic forecast configured to predict traffic information for a website operated by a publisher.

13. A non-transitory computer readable storage media storing processor-executable instructions, which, when executed by a server comprising the storage media and one or more processors, cause the one or more processors to:

receive a first content campaign involving a first content provider and a content publisher, and a second content campaign involving a second content provider and the content publisher, the first content campaign comprising a first article of content, and the second content campaign comprising a second article of content;

generate a campaign database configured to store received campaigns in the computer readable storage media;

generate a first time window for publishing the first content, the first time window comprising a first start time and a first end time;

generate a first quota indicating a first total number of publications of the first article of content a content server is configured to publish during the first time window;

generate a second time window for publishing the second content, the second time window comprising a second start time and a second end time, wherein the first time window and the second time window share a period of overlapping time;

generate a second quota indicating a second total number of publications of the second article of content the content server is configured to publish during the second time window;

determine, for the first article of content, a first publication rate equal to a first average number of publications per unit of time needed to satisfy the first quota;

determine, for the second article of content, a second publication rate equal to a second average number of publications per unit of time needed to satisfy the second quota;

determine whether the scheduler can satisfy the first quota by publishing the first article of content at the first publication rate during the period of overlapping time; and when the scheduler can satisfy the first quota by publishing the first article of content at the first publication rate during the period of overlapping time, instruct a content placement server to publish the first article of content at the first publication rate, and otherwise when the scheduler cannot satisfy the first quota by publishing the first article of content at the first publication rate during the period of overlapping time, instruct the content placement server to publish the first article of content at a third publication rate higher than the first publication rate.

14. A method for operating a content scheduler on a server, the server comprising tangible computer readable storage media and a processor, the method comprising:

receiving, with a campaign receiver, a first content campaign involving a first content provider and a content publisher, and a second content campaign involving a second content provider and the content publisher, the first campaign comprising a first article of content, the second campaign comprising a second article of content;

storing received campaigns in the tangible computer readable storage media;

generating, with the processor,
a first time window for publishing the first article of content; the first time window comprising a first start time and a first end time;
a first quota indicating a first total number of impressions a content server is configured to deliver during the first time window;
a second time window for publishing the second article of content, the second time window comprising a second start time and a second end time, wherein the first time window and the second time window share a period of overlapping time; and
a second quota indicating a second total number of impressions the content server is configured to deliver during the second time window; and determining, via an analyzer operated by the processor,
a first average number of publications of the first article of content per unit of time needed to satisfy the first quota;
a second average number of publications of the second article of content per unit of time needed to satisfy the second quota; and
whether the scheduler can satisfy the first quota by publishing the first article of content at the first average during the period of overlapping time, and scheduling the first article of content to be published at a first rate equal to the first average number of impressions per unit of time when the scheduler can satisfy the first quota by publishing the first article of content at the first rate during the period of overlapping time; else scheduling the first article of content to be published at a second rate greater than the first rate.

15. The method of claim 14, further comprising:
determining the period of overlapping time between the first time window for publishing the first article of content and the second time window for publishing the second article of content;
determining a period of non-overlapping time between the first time window for publishing the first article of content and the second time window for publishing the second article of content; and
generating schedule data for publishing the first article of content at a publication rate higher than the first rate during the period of non-overlapping time sufficient to satisfy the first quota.

16. The method of claim 14, further comprising determining which content to schedule for publication during the period of overlapping time.

17. The method of claim 14, further comprising: publishing the first article of content during the period of overlapping time.

18. The method of claim 14, further comprising:
identifying a portion of the period of overlapping time that has a higher forecasted click through rate as compared to an average forecasted click through rate of the period of overlapping time;
determining a higher priority content from among the first article of content and the second article of content; and
scheduling the higher priority content to be published during the identified portion of time having the higher forecasted click through rate.

19. The method of claim 18, further comprising: determining the higher priority content by comparing a first preexisting relationship between the first content provider and the content publisher and a second preexisting relationship between the second content provider and the content publisher.

20. The method of claim 14, further comprising:
determining a higher priority content and a lower priority content from among the first article of content and the second article of content using ranking logic;
determining a first portion and a second portion of the overlapping time between the first time window for publishing the first article of content and the second time window for publishing the second article of content, wherein the first portion has a higher expected click through rate average than the second portion; and
instructing the content server to schedule the higher priority content for publication during the first portion and the lower priority content for publication during the second portion.

21. The method of claim 14, further comprising:
- determine, for the first article of content, a third publication rate equal to an average number of publications per unit of time needed to satisfy the first quota during the first time window less the period of overlapping time; and
- instructing the content server to publish the first article of content at the third publication rate during a portion of the first time window that does not overlap with the second time window.

* * * * *